United States Patent
Espeseth et al.

(10) Patent No.: US 11,003,614 B2
(45) Date of Patent: May 11, 2021

(54) EMBEDDING PROTOCOL PARAMETERS IN DATA STREAMS BETWEEN HOST DEVICES AND STORAGE DEVICES

(71) Applicant: Western Digital Technologies, Inc., Irvine, CA (US)

(72) Inventors: Adam Espeseth, Rochester, MN (US); Colin Christopher McCambridge, Rochester, MN (US)

(73) Assignee: WESTERN DIGITAL TECHNOLOGIES, INC., Irvine, CA (US)

( * ) Notice: Subject to any disclaimer, the term of this patent is extended or adjusted under 35 U.S.C. 154(b) by 295 days.

(21) Appl. No.: 15/257,541

(22) Filed: Sep. 6, 2016

(65) Prior Publication Data
US 2018/0067890 A1    Mar. 8, 2018

(51) Int. Cl.
*G06F 13/42* (2006.01)
*G06F 13/40* (2006.01)
*G06F 13/24* (2006.01)
*G06F 3/06* (2006.01)
*G06F 11/36* (2006.01)

(52) U.S. Cl.
CPC .......... *G06F 13/4282* (2013.01); *G06F 13/24* (2013.01); *G06F 13/4022* (2013.01); *G06F 3/0655* (2013.01); *G06F 11/3656* (2013.01)

(58) Field of Classification Search
CPC ......... G06F 3/0655; G06F 2009/45579; G06F 13/4282; G06F 13/4286; G06F 13/4269; G06F 13/4252; G06F 13/4295; G06F 11/3656; H04L 67/1097
See application file for complete search history.

(56) References Cited

U.S. PATENT DOCUMENTS

| | | | |
|---|---|---|---|
| 7,352,706 B2 | 4/2008 | Klotz et al. | |
| 7,496,801 B2 | 2/2009 | Glass et al. | |
| 8,145,777 B2 | 3/2012 | Ryman et al. | |
| 8,738,818 B2 | 5/2014 | Mahajan | |
| 8,880,957 B2 | 11/2014 | Chencinski et al. | |
| 2016/0127468 A1* | 5/2016 | Malwankar | G06F 9/45558 709/212 |

OTHER PUBLICATIONS

Tektronix PCI Express Logic Protocol Analyzer, TLA7SA00 Series Datasheet, Retrieved from http://www.tek.com/sites/tek.com/files/media/media/resources/PCI-Express-Logic-Protocol-Analyzer-Datasheet-52W2569111.pdf, Jan. 26, 2016, 14 pgs.

(Continued)

*Primary Examiner* — Ernest Unelus
(74) *Attorney, Agent, or Firm* — Arent Fox LLP (57) ABSTRACT

A method includes receiving, by a storage device and from a host device, a set of protocol parameters initialized by the host device. The set of protocol parameters are used to facilitate data transfer between the host device and the storage device. The method also includes determining that a threshold value associated with the data transfer between the host device and the storage device has been satisfied. The method further includes, in response to determining that the threshold value has been satisfied, sending, by the storage device and to the host device, the set of protocol parameters that were received from the host device.

20 Claims, 7 Drawing Sheets

(56) References Cited

OTHER PUBLICATIONS

Teledyne Lecroy, U.2 (SFF-8639) Single Port Interposer for PCI Express 3.0 (12-inch version), Retrieved from http://cdn.teledynelecroy.com/files/pdf/sp12inch-pcie3.0-u.2%28sff-8639%29-interposer.pdf, Aug. 2015, 2 pgs.

Keysight Technologies, E2960A Protocol Analyzer and Protocol Exerciser for PCI Express, Retrieved from http://www.keysight.com/en/pd-230171-pn-E2960A/protocol-analyzer-and-protocol-exerciser-for-pci-express?cc=IN&lc=eng, Apr. 5, 2016, 2 pgs.

Lecklider, Evaluation Engineering, "Traveling in the PCI Express Lane", Retrieved from http://www.evaluationengineering.com/articles/200506/traveling-in-the-pci-express-lane.php, Jun. 1, 2005, 4 pgs.

\* cited by examiner

EMBEDDING PROTOCOL PARAMETERS IN DATA STREAMS BETWEEN HOST DEVICES AND STORAGE DEVICES

TECHNICAL FIELD

The disclosure generally relates to storage devices.

BACKGROUND

A host device may exchange data with a storage device via an interface protocol such as Peripheral Component Interconnect Express (PCIe) or Non-Volatile Memory Express (NVMe) via PCIe. To facilitate development of storage devices, such as in the context of enterprise network attached storage (NAS) or enterprise data centers, developers, administrator, or other operators may utilize a tool referred to as an "analyzer" to inspect or otherwise gather data regarding the exchange of data via the interface protocols. The analyzer may parse the commands sent via the interface protocol to reveal inefficiencies, errors, or other issues occurring between the host device and the storage devices. These operators may reconfigure the host device and/or the storage device operation to correct for the inefficiencies, errors or other issues.

SUMMARY

In one example, a method includes receiving, by a storage device and from a host device, a set of protocol parameters initialized by the host device and used to facilitate data transfer between the host device and the storage device. The method also includes determining that a threshold value associated with the data transfer between the host device and the storage device has been satisfied. The method further includes, in response to determining that the threshold value has been satisfied, sending, by the storage device and to the host device, the set of protocol parameters that were received from the host device.

In another example, a data storage device includes a controller. The controller is configured to receive, from a host device, a set of protocol parameters initialized by the host device and used to facilitate data transfer between the host device and the data storage device. The controller is also configured to determine that a threshold value associated with the data transfer between the host device and the storage device has been satisfied. The controller is further configured to, in response to determining that the threshold value has been satisfied, send, to the host device, the set of protocol parameters that were received from the host device.

In another example, a system includes a host device and a storage device. The host device is configured to initialize a set of protocol parameters used to facilitate data transfer between the storage device and the host device. The host device is also configured to send, to the storage device, the set of protocol parameters initialized by the host device. The storage device is configured to determine whether a threshold value associated with the data transfer between the host device and the storage device has been satisfied. The storage device is further configured to, in response to determining that the threshold value has been satisfied, reseed, to the host device, the set of protocol parameters received from the host device.

The details of one or more examples are set forth in the accompanying drawings and the description below. Other features, objects, and advantages will be apparent from the description and drawings, and from the claims.

DETAILED DESCRIPTION

In general, this disclosure describes techniques for providing protocol parameters to an analyzer when transferring data between a host device and a storage device. In some examples, a storage device may communicate with a host device using a Non-Volatile Memory Express (NVMe) protocol via a Peripheral Component Interconnect Express (PCIe) protocol. In examples using the NVMe protocol, a host device may initialize a set of protocol parameters and may send the protocol parameters to the storage device, which may enable to storage device to decode subsequent data transfers received from the host device.

An analyzer may be connected between the host device and the storage device. As data is transferred between the host device and the storage device, the analyzer may parse the data to discover issues that may occur during the transfer of data and to assist a user when debugging the transfer of data. In some examples, the analyzer may intercept the protocol parameters, which may enable the analyzer to decode data transferred between the host device and the storage device. However, if the analyzer is connected between the host device and the storage device after the protocol parameters are initialized, the analyzer may not receive the protocol parameters, which may prevent the analyzer from being able to decode the subsequently received low level PCIe data to higher level NVMe data. Rather than sending the protocol parameters only upon the initialization of the storage device, the host device or the data storage device may periodically retransmit the protocol parameters. By periodically resending the protocol parameters, the host device or the data storage device may enable the analyzer to intercept the protocol parameters in order to decode the low level PCIe data to higher level NVMe data as the data is exchanged between the host device and the storage device.

Figure 1:
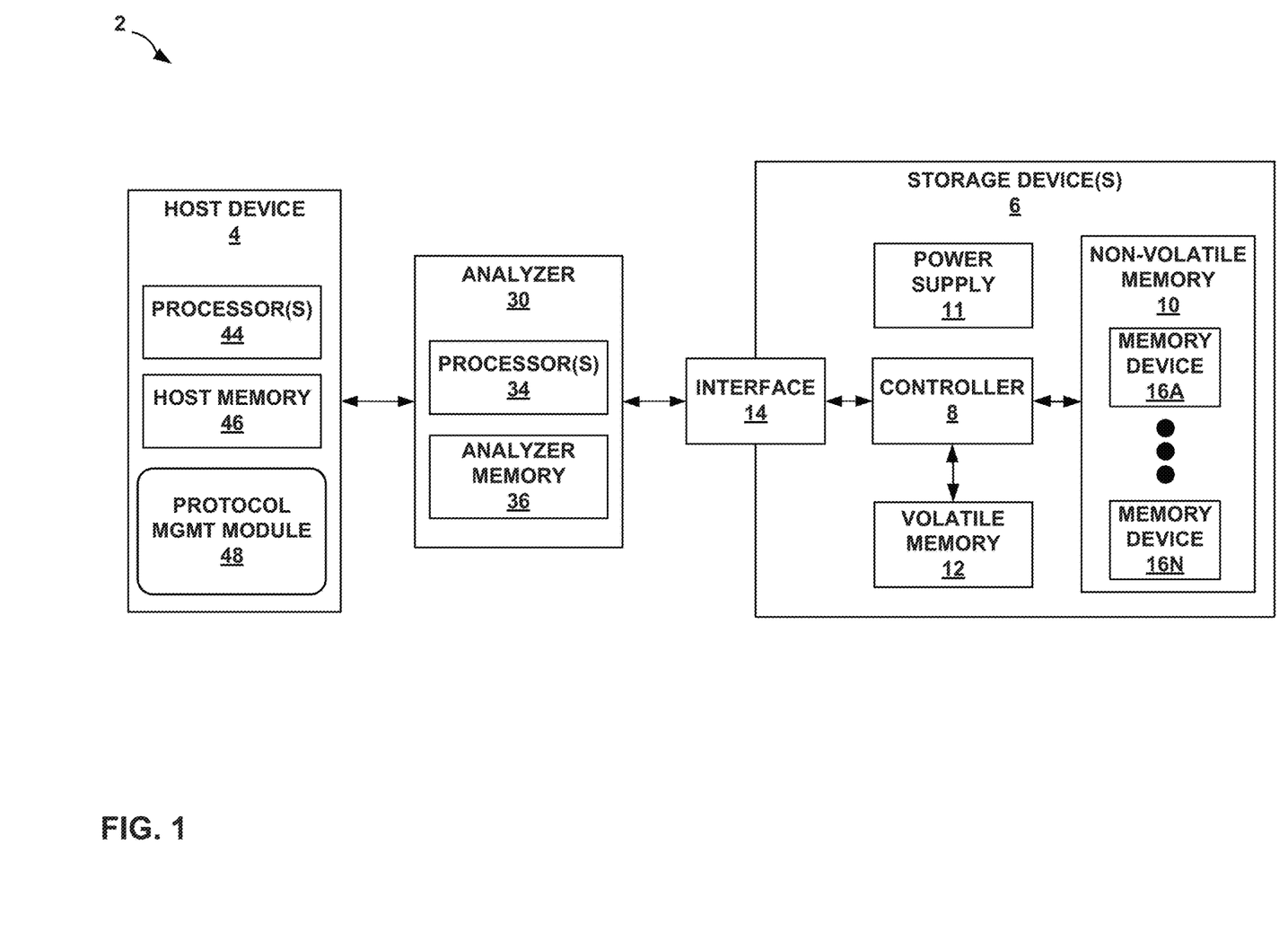
FIG. 1 is a conceptual and schematic block diagram illustrating an example storage environment in which a storage device may interact with a host device, in accordance with one or more techniques of this disclosure, to facilitate analyzer operation.

FIG. 1 is a conceptual and schematic block diagram illustrating an example storage environment 2 in which storage device 6 may function as a storage device for host device 4, in accordance with one or more techniques of this disclosure, to facilitate operation of analyzer 30. For instance, host device 4 may store data to and/or retrieve data from one or more storage devices 6. In some examples, storage environment 2 may include a plurality of storage devices, such as storage device 6, which may operate as a storage array. For instance, storage environment 2 may include a plurality of storages devices 6 configured as a redundant array of inexpensive/independent disks (RAID) that collectively function as a mass storage device for host device 4. Storage environment 2 may include analyzer 30 connected between host device 4 and storage device 6. Analyzer 30 may intercept data as the data is transferred between host device 4 and storage device 6 in order to analyze the data transfer and assist a user when debugging the data transfer. For instance, if an error occurs during the data transfer, analyzer 30 may assist a developer, technician, or other user when debugging the data transfer.

Host device 4 may include any computing device, including, for example, a computer server, a network attached storage (NAS) unit, a desktop computer, a notebook (e.g., laptop) computer, a tablet computer, a set-top box, a mobile computing device such as a "smart" phone, a television, a camera, a display device, a digital media player, a video gaming console, a video streaming device, or the like. Host device 4 may include at least one processor 44 and host memory 46. At least one processor 44 may include any form of hardware capable of processing data and may include a general purpose processing unit (such as a central processing unit (CPU)), dedicated hardware (such as an application specific integrated circuit (ASIC)), configurable hardware (such as a field programmable gate array (FPGA)), or any other form of processing unit configured by way of software instructions, microcode, firmware, or the like. Host memory 46 may be used by host device 4 to store data (e.g., temporarily store data). In some examples, host memory 46 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like).

As illustrated in FIG. 1, storage device 6 may include controller 8, non-volatile memory 10 (NVM 10), power supply 11, volatile memory 12, and interface 14. In some examples, storage device 6 may include additional components not shown in FIG. 1 for sake of clarity. For example, storage device 6 may include a printed board (PB) to which components of storage device 6 are mechanically attached and which includes electrically conductive traces that electrically interconnect components of storage device 6, or the like. In some examples, the physical dimensions and connector configurations of storage device 6 may conform to one or more standard form factors. Some example standard form factors include, but are not limited to, 3.5" data storage device (e.g., an HDD or SSD), 2.5" data storage device, 1.8" data storage device, Peripheral Component Interconnect (PCI), PCI-extended (PCI-X), PCI Express (PCIe) (e.g., PCIe x1, x4, x8, x16, PCIe Mini Card, MiniPCI, etc.), M.2, or the like. In some examples, storage device 6 may be directly coupled (e.g., directly soldered) to a motherboard of host device 4. In some examples, storage device 6 may be directly connected to host device 4. In other examples, storage device 6 may be indirectly connected to host device 4 (e.g., via analyzer 30).

Storage device 6 may include interface 14 for interfacing with host device 4. Interface 14 may include one or both of a data bus for exchanging data with host device 4 and a control bus for exchanging commands with host device 4. Interface 14 may operate in accordance with any suitable protocol. For example, interface 14 may operate according to a high level protocol operating over a low level protocol. For instance, the low level protocol may include a PCI or PCIe protocol and the high level protocol may include the Non-Volatile Memory Express (NVMe) protocol. In other examples, the high level protocol may include Advanced Host Controller Interface (AHCI), SCSI over PCIe (SOP), PCIe Queuing Interface (PQI), or any other high level protocol that is built on top of a low level (e.g., PCIe) protocol. The interface 14 (e.g., the data bus, the control bus, or both) is electrically connected to controller 8, providing a communication channel between host device 4 and controller 8, allowing data to be transferred between host device 4 and controller 8. In some examples, the electrical connection of interface 14 may also permit storage device 6 to receive power from host device 4 or analyzer 30.

Storage device 6 may include volatile memory 12, which may be used by controller 8 to store data. In some examples, controller 8 may use volatile memory 12 as a cache. For instance, controller 8 may store cached data in volatile memory 12 until the cached data is written to NVM 10. Volatile memory 12 may consume power received from power supply 11. Examples of volatile memory 12 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like)).

Storage device 6 may include power supply 11, which may provide power to one or more components of storage device 6. When operating in a standard mode, power supply 11 may provide power to the one or more components using power provided by an external device, such as host device 4. For instance, power supply 11 may provide power to the one or more components using power received from host device 4 via interface 14. In some examples, power supply 11 may include one or more power storage components configured to provide power to the one or more components when operating in a shutdown mode, such as where power ceases to be received from the external device. In this way, power supply 11 may function as an onboard backup power source. Some examples of the one or more power storage components include, but are not limited to, capacitors, super capacitors, batteries, and the like.

Storage device 6 includes NVM 10, which includes a plurality of memory devices 16A-16N (collectively, "memory devices 16"). Each of memory devices 16 may be configured to store and/or retrieve data. For instance, a memory device of memory devices 16 may receive data and a message from controller 8 that instructs the memory device to store the data. Similarly, the memory device of memory devices 16 may receive a message from controller 8 that instructs the memory device to retrieve data. In some examples, each of memory devices 16 may be referred to as a die. In some examples, a single physical chip may include a plurality of dies (i.e., a plurality of memory devices 16). In some examples, each of memory devices 16 may be configured to store relatively large amounts of data (e.g., 512 MB, 4 GB, 16 GB, 64 GB, 256 GB, 512 GB, 1 TB, etc.). NVM 10 may include any type of non-volatile memory devices. Some examples of WM 10 include, but are not limited to flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

Storage device 6 includes controller 8, which may manage one or more operations of storage device 6. For instance, controller 8 may manage the reading of data from and/or the writing of data to memory devices 16. Controller 8 may represent one of or a combination of one or more of a microprocessor, digital signal processor (DSP), application specific integrated circuit (ASIC), field programmable gate array (FPGA), or other digital logic circuitry.

Analyzer 30 may include at least one processor 34 and analyzer memory 36, which may be similar to processor 44 and host memory 46, respectively. Analyzer 30 may intercept data transferred between host device 4 and storage device 6 in order to analyze and debug the data transfer. In some examples, the intercepted data may include a write command (e.g., to write to a memory device 16, to a configuration space, to a doorbell register, etc.) or a read command (e.g., to read from a memory device 16, a configuration space, etc.). In some examples, a write command or a read command may include protocol parameters. Analyzer 30 may store metadata about the data transferred between host device 4 and storage device 6. For example, analyzer 30 may store a packet identifier, an indication of the direction of data flow (e.g., from storage device 6 to host device 4), timestamp data, or other data useful for debugging the data transfer. In some examples, analyzer 30 may output the metadata or a summary of the metadata for further analysis by a computing device or person.

As discussed above, host device 4 and storage device 6 may exchange protocol parameters, which may facilitate data transfer between storage device 6 and host device 4. For example, the protocol parameters may include a base address register (BAR) configuration associated with a PCI function. For instance, the BAR configuration may include a base address and size associated with the PCI function. As another example, the protocol parameters may include a command queue configuration (e.g., a base address and size), message signal interrupt (MSI-X) registrations, or the like.

Typically, host device 4 and storage device 6 only exchange the protocol parameters during initialization of storage device 6 (e.g., upon powering up storage device 6 or coupling of storage device 6 to host device 4). As such, the administrator of system 2 may need to insert analyzer 30 between host device 4 and storage device 6 prior to initialization of storage device 6 so as to properly capture the protocol parameters, which may be necessary to properly decode low level PCIe data to higher level NVMe data. However, often times, issues in system 2 that require troubleshooting by analyzer 30 may only arise after hours or possibly days of data transfers between host device 4 and storage device 6. Restarting storage device 6 may to allow for insertion of analyzer 30 so as to capture the protocol parameters may thereby create delays that last for hours or days until such issues begin to occur again, thereby potentially preventing prompt resolution of such issues.

In accordance with examples of this disclosure, host device 4 and/or storage device 6 may exchange, after initialization of storage device 6 (either during powering on storage device 6 or coupling storage device 6 to host device 4), protocol parameters with one another in order to facilitate operation of analyzer 30. Host device 4 and/or storage device 6 may initialize a set of protocol parameters by assigning a memory address to a functionality of host device 4 or storage device 6. In some examples, host device 4 may initialize a set of one or more protocol parameters in response to receiving a power-on signal or in response to storage device 6 being connected to host device 4. For example, host device 4 may perform an enumeration sequence and may initialize the protocol parameters by assigning a BAR0 address to a PCI function of storage device 6. In some examples, host device 4 may initialize the set of protocol parameters by assigning a host memory address and size to a command queue. In other examples, host device 4 may initialize a set of protocol parameters by assigning a register address to an interrupt vector. In some examples, storage device 6 may initialize a set of protocol parameters and may send the protocol parameters initialized by storage device 6 to host device 4 in response to a query by host device 4. In some instances, the set of protocol parameters initialized by storage device 6 may include PCIe configuration space registers internal to storage device 6 and/or NVMe registers internal to storage device 6.

Responsive to initializing the set of protocol parameters, host device 4 may send the set of protocol parameters to storage device 6. In some examples, host device 4 may send, to storage device 6, a command that includes the set of protocol parameters. For example, the command may include a command to write a BAR address to the configuration space of storage device 6. In some examples, the command may include a read command to read data from NVM 10 and store the data to a particular physical region page (PRP) of host memory 46. In other examples, the command may include a command to write a memory address associated with a command queue (e.g., an admin queue or I/O queue) to a system memory of storage device 6. For instance, host device 4 may send a write command to cause storage device 6 to store a host memory address associated with an I/O queue.

In contrast to some examples where analyzer 30 does not receive the protocol parameters, or which require a user of analyzer 30 to manually input the protocol parameters for use by analyzer 30, techniques of this disclosure may enable host device 4 and/or storage device 6 to resend the protocol parameters, or in other words, exchange the protocol parameters after initialization of storage device 6 (either during powering up of storage device 6 or coupling of storage device 6 to host device 4).

Host device 4 and storage device 6 may exchange the set of protocol parameters after the initial exchange. In some examples, host device 4 may include protocol management module (PMM) 48, which may manage resending the set of protocol parameters to storage device 6. As described in more detail with reference to FIG. 2, in some examples, storage device 6 may include a protocol management module (e.g., PMM 28 of FIG. 2) which may include the functionality of PMM 48. PMM 48 may resend the set of protocol parameters to storage device 6 as part of a data packet. The data packet may be defined by one or more features that indicate the packet includes the set of protocol parameters, such as the size of the data packet, a memory address specified by the data packet, a format of the header of the data packet (e.g., a predefined header format), or a function (e.g., a PCIe function) indicated by the data packet. Analyzer 30 may intercept the data packet and determine that the data packet includes the set of protocol parameters because the data packet includes one or more of the features. As one example, analyzer 30 may intercept the data packet, determine that the header of the data packet includes the predetermined memory address (e.g., in a field that specifies the destination of the data packet), and determine that the data packet includes the set of protocol parameters because the header of the data packet specifies the destination of the data packet includes the predetermined memory address.

In some examples, PMM 48 may resend the set of protocol parameters in response to a triggering event. In some instances, a triggering event may include a change to a command queue (e.g., an admin queue or an I/O queue) or an interrupt configuration. For instance, a change to a command queue may include the creation or deletion of a command queue.

In some examples, PMM 48 may periodically resend the set of protocol parameters. For example, PMM 48 may determine whether a threshold associated with the data transfer between the host device and the storage device has been satisfied and may resend the set of protocol parameters in response to determining that a threshold value has been satisfied. In some instances, a threshold value may refer to a threshold amount of data, a threshold amount of time, or a threshold number of commands.

In some examples, PMM 48 may command storage device 6 to store the set of protocol parameters at predefined memory address associated with storage device 6. For example, the predefined memory address may include a reserved logical block address (LBA) associated with volatile memory 12 or NVM 10. In some examples, the memory address may not be predetermined. For instance, host device 4 may generate a write command to store user data to a particular memory address associated with storage device 6, and PMM may cause storage device 6 to write the set of protocol parameters to the particular memory address before writing the user data to the particular memory address associated with storage device 6.

In this manner, a host device and/or a storage device may resend protocol parameters. By resending the set of protocol parameters from the host device to the storage device (or vice versa), the host device and storage device may enable an analyzer to intercept the set of protocol parameters even if the analyzer did not receive the protocol parameters the first time the protocol parameters were sent. In this way, the analyzer may receive the protocol parameters and may decode data sent using a high level protocol that sits on top of a low level protocol.

Figure 2:
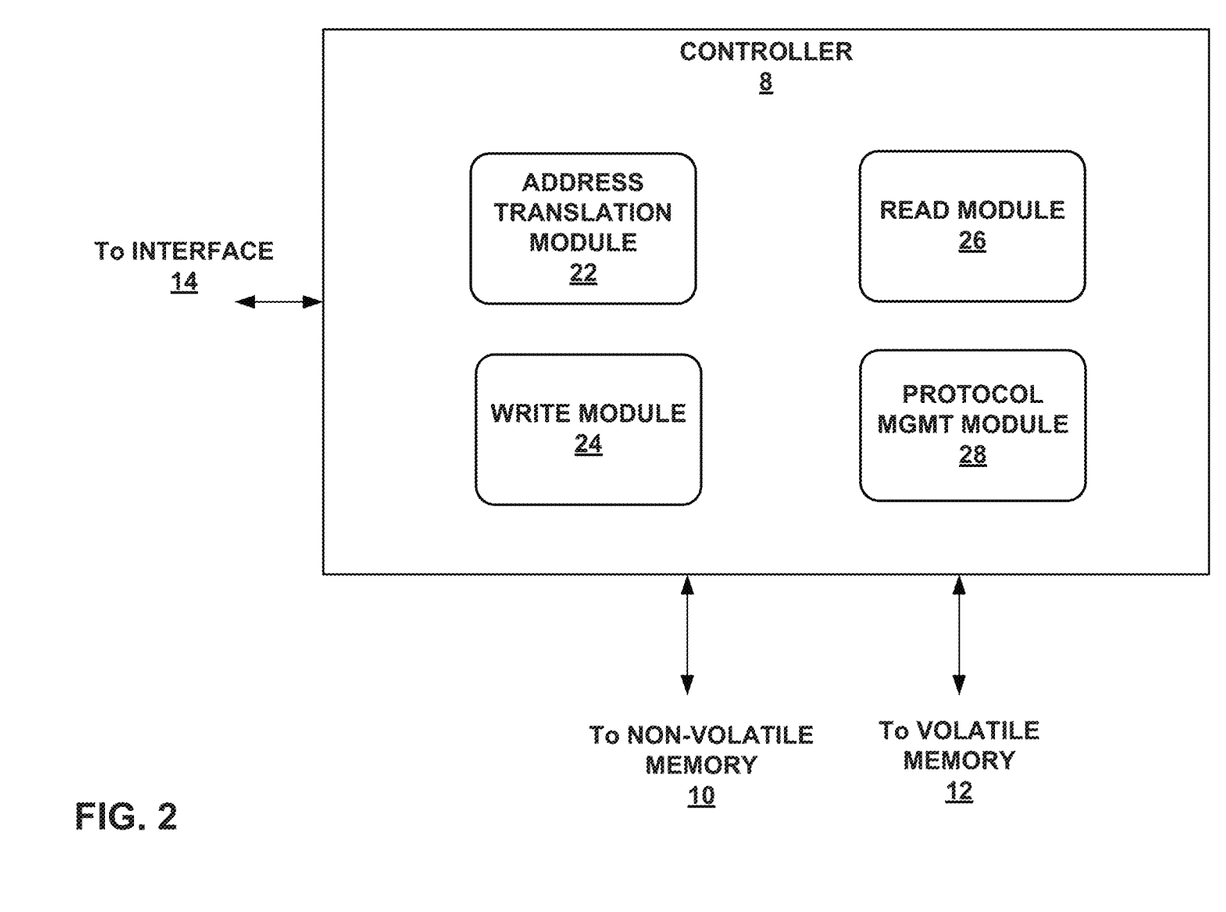
FIG. 2 is a conceptual and schematic block diagram illustrating an example controller configured to operate in accordance with one or more techniques of this disclosure, to facilitate analyzer operation.

FIG. 2 is a conceptual and schematic block diagram illustrating further details of an example storage environment 2 in which storage device 6 may function as a storage device for host device 4, in accordance with one or more techniques of this disclosure, to facilitate analyzer operation. In some examples, controller 8 may include address translation module 22, write module 24, read module 26, and protocol management module 28. In other examples, controller 8 may include additional modules or hardware units, or may include fewer modules or hardware units. Controller 8 may include a microprocessor, digital signal processor (DSP), application specific integrated circuit (ASIC), field programmable gate array (FPGA), or other digital logic circuitry. In some examples, controller 8 may be a system on a chip (SoC).

Controller 8 may interface with host device 4 via interface 14 and manage the storage of data to and the retrieval of data from NVM 10 and/or volatile memory 12. For example, write module 24 may receive a write command from host device 4 via interface 14 instructing storage device 6 to store data to NVM 10.

Write module 24 may communicate with address translation module 22, which manages translation between logical addresses used by host device 4 to manage storage locations of data and physical block addresses (PBAs) used by write module 24 to direct writing of data to NVM 10. Address translation module 22 may utilize a flash translation layer or table that translates logical addresses (or logical block addresses (LBAs)) of data stored by NVM 10 to physical block addresses of data stored by NVM 10. For example, host device 4 may utilize the logical block addresses of the data stored by NVM 10 in instructions or messages to storage device 6, while write module 24 utilizes physical block addresses of the data to control writing of data to NVM 10. (Similarly, read module 26 may utilize physical block addresses to control reading of data from NVM 10.) The physical block addresses correspond to actual, physical blocks of NVM 10. In some examples, address translation module 22 may store the flash translation layer or table in volatile memory 12.

As discussed above, write module 24 may perform one or more operations to manage the writing of data to NVM 10. For example, write module 24 may manage the writing of data to NVM 10 by selecting one or more blocks within NVM 10 to store the data and causing the selected blocks to actually store the data. As discussed above, mite module 24 may cause address translation module 22 to update the flash translation layer or table based on the selected blocks. For instance, write module 24 may receive a command from host device 4 that includes a unit of data and a logical block address, select a block within NVM 10 to store the data, cause the selected block to actually store the data, and cause address translation module 22 to update the flash translation layer or table to indicate that the logical block address corresponds to the selected block within NVM 10.

Read module 26 similarly may control reading of data from NVM 10. For example, read module 26 may receive a message from host device 4 requesting data with an associated logical block address. Address translation module 22 may convert the logical block address to a physical block address using the flash translation layer or table. Read module 26 then may retrieve the data from the physical block addresses.

PMM 28 may include all of the functionality of PMM 48 of host device 4 of FIG. 1 and may perform similar operations as PMM 48 for transferring a set of protocol parameters between host device 4 and storage device 6. For example, storage device 6 may receive a set of protocol parameters from host device 4, where the set of protocol parameters were previously initialized by host device 4. PPM 28 may resend the set of protocol parameters to host device 4 in order to inject the set of protocol parameters into a data stream that may be monitored by analyzer 30. In some examples, PMM 28 of controller 8 may send the set of protocol parameters to host device 4 as part of a data packet. The data packet may be defined by one or more features that indicate the data packet includes the set of protocol parameters. In some examples, the one or more features that indicate the data packet includes the set of protocol parameters may include a size of the data packet, a destination address specified by the data packet, a format of the header of the data packet (e.g., a predefined header format), or a function (e.g., an invalid PCIe function) indicated by the data packet. In other words, analyzer 30 may identify the data packet as a data packet that includes a set of protocol parameters based on the one or more features. For instance, the data packet may include a particular and unusual number of bytes such that when analyzer 30 intercepts the data packet with a particular and unusual number of bytes, analyzer 30 may determine that the data packet includes the set of protocol parameters. In some instances, the data packet may specify a host memory address reserved for the set of protocol parameters (e.g., in a destination field of the data packet header). In other words, the data packet may be directed to a predefined host memory address reserved for the set of protocol parameters, such that when analyzer 30 intercepts the data packet that specifies the predefined host memory address, analyzer 30 may determine that the data packet includes the set of protocol parameters (e.g., because the destination address in the header of the data packet includes the predefined memory address). In some examples, the data packet may include error correction data (e.g., CRC data) to reduce the probability that analyzer 30 incorrectly identifies a data packet as including protocol parameters.

PMM 28 of controller 8 may periodically resend the set of protocol parameters to host device 4. In some instances, PMM 28 may resend the set of protocol parameters frequently enough to increase the likelihood that a copy of the protocol parameters is always in a bus trace. PMM 28 may resend the set of protocol parameters in response to determining that a threshold value has been met. In some examples, the threshold value may include an amount of data. PMM 28 may determine an amount of data transferred between host device 4 and storage device 6 since the set of protocol parameters were most recently transferred. PMM 28 may determine that the threshold value is satisfied if the amount of data transferred since the protocol parameters were most recently transferred is greater than or equal to the threshold amount of data. In response to determining that the amount of data transferred since the set of protocol parameters were most recently transferred is greater than or equal to a threshold amount of data, PMM 28 may resend the set of protocol parameters. In some examples, the threshold amount of data may be based on the size of analyzer memory 36. For example, controller 8 may receive an indication of the size of analyzer memory 36 (e.g., from analyzer 30 or from a user of storage environment 2). In some instances, PMM 28 may set the threshold value to be equal to, or less than, the size of analyzer memory 36. By setting the threshold value to be equal to or less than the size of analyzer memory 36. PMM 28 may maintain at least one copy of the protocol parameters in analyzer memory 36. For instance, if controller 8 receives an indication that analyzer memory 36 includes 1 GB of memory, PMM 28 may resend the set of protocol parameters at least once for every 1 GB of data transferred between host device 4 and storage device 6.

In some examples, the threshold value may include a number of commands transferred between host device 4 and storage device 6. For example, PMM 28 may determine the number of commands transferred between host device 4 and storage device 6 since either host device 4 or storage device 6 most recently transferred the set of protocol parameters. In response to determining that the number of commands transferred since the protocol parameters were last transferred is greater than or equal to a threshold number of commands, PMM 28 may resend the set of protocol parameters.

In some examples, the threshold value may include a threshold amount of time. For instance, PMM 28 may determine the amount of time that has elapsed since the set of protocol parameters were most recently transferred. In response to determining that the amount of time since the protocol parameters were last transferred is greater than or equal to a threshold amount of time, PMM 28 may resend the set of protocol parameters.

PMM 28 may resend the set of protocol parameters in response to a triggering event. In some examples, a triggering event may include a change to a command queue or an interrupt configuration. For example, host device 4 may change the status of a command queue by creating or deleting a command queue. In some instances, in response to receiving an indication that host device 4 created or deleted a command queue (e.g., an I/O queue) in host memory 46, PMM 28 may resend the set of one or more protocol parameters to host device 4. In some examples, PMM 28 may resend the set of protocol parameters in response to determining that the at least one of host device 4 or storage device 6 is idle. For instance, PAW 28 may detect that no information is currently being transmitted across interface 14 and may resend the set of protocol parameters to host device 4.

In some examples, PMM 28 may resend the set of protocol parameters to a predefined memory address associated with storage device 6. For example, a portion of host memory 46 may be reserved for the set of protocol parameters. Thus, PMM 28 may send a write command to host device 4 to write the set of protocol parameters to the reserved portion of host memory 46.

In some examples, PMM 28 may send the set of protocol parameters to a memory address specified by host device 4. For example, storage device 6 may retrieve a read command from an 110 queue of host device 4, where the retrieved read command specifies an address within NVM 10 from which to read data. Storage device 6 may also receive, from host device 4, an indication of an address within host memory 46 where the data is to be sent. For example, storage device 6 may receive a physical region page (PRP) or a scatter gather list (SGL) that indicates an address within host memory 46 where the data is to be sent. In response to receiving the read command, PMM 28 may send the set of protocol parameters to the host memory address indicated by host device 4. Read module 26 may read the data from the requested NVM 10, and after sending the set of protocol parameters to the host memory address indicated by the host device (e.g., via a PRP or SGL), read module 26 may send the requested data to the host memory address indicated by the host device. By sending the set of protocol parameters to the host memory address indicated by the host device and then overwriting with the actual data requested by host device 4, controller 8 may inject the set of protocol parameters into the data stream while still sending the requested data to host device 4. Thus, analyzer 30 may intercept the set of protocol parameters and host device 4 may receive the requested data.

FIGS. 3A-3D are conceptual flow diagrams illustrating example operations of a storage environment, in accordance with one or more techniques of this disclosure, to facilitate analyzer operation. For ease of illustration, the technique of FIGS. 3A-3D will be described with concurrent reference to storage environment 2 of FIGS. 1-2. However, the techniques may be used with any combination of hardware or software.

Figure 3A:
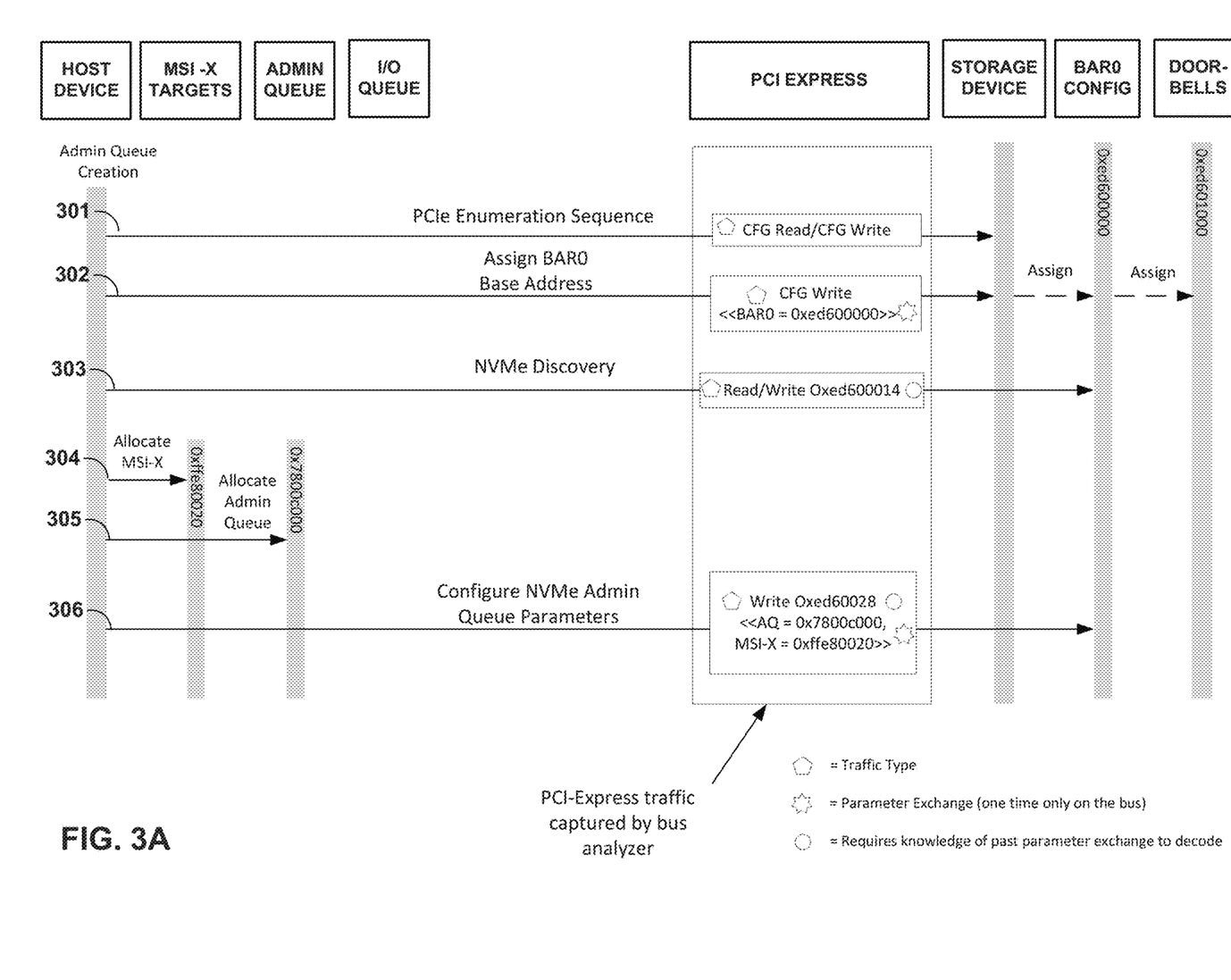
FIGS. 3A-3D are conceptual flow diagrams illustrating example operations of a storage environment, in accordance with one or more techniques of this disclosure, to facilitate analyzer operation.

As illustrated in FIG. 3A, host device 4 may perform a PCI-Express enumeration sequence (301) in response to receiving a power-on signal or in response to storage device 6 being connected to host device 4. In response to performing the enumeration sequence, host device 4 may initialize a first set of protocol parameters by assigning a BAR0 base address and size to a PCI function and may send the first set of protocol parameters to storage device (302). For example, host device 4 may send the first set of protocol parameters by sending a command to write the set of protocol parameters to the configuration space of storage device 6. Host device 4 may perform an NVMe discovery operation (303). For example, host device 4 may query the NVMe registers to discover the capabilities of storage device 6 and select one or more configuration parameters. In some instances, the NVMe discovery operation includes a read or write command which includes a memory address that may be decoded using the first set of protocol parameters.

In some examples, host device 4 may initialize a second set of protocol parameters by allocating a first M interrupt vector (304) and allocating an admin queue (305). In some instances, allocating a first MSI-X interrupt vector may include assigning a register address to the first interrupt vector and allocating an admin queue may include assigning a host memory address (e.g., a base address), and size, to the admin queue. In some instances, the first MSI-X vector may be associated with the admin queue. Host device 4 may send the second set of protocol parameters to storage device 6 (306). For example, host device 4 may send a write command to storage device 6 to cause storage device 6 to store the second set of protocol parameters (e.g., address data associated with an interrupt vector and address data associated with an admin queue) to the BAR0 configuration space of storage device 6.

Figure 3B:
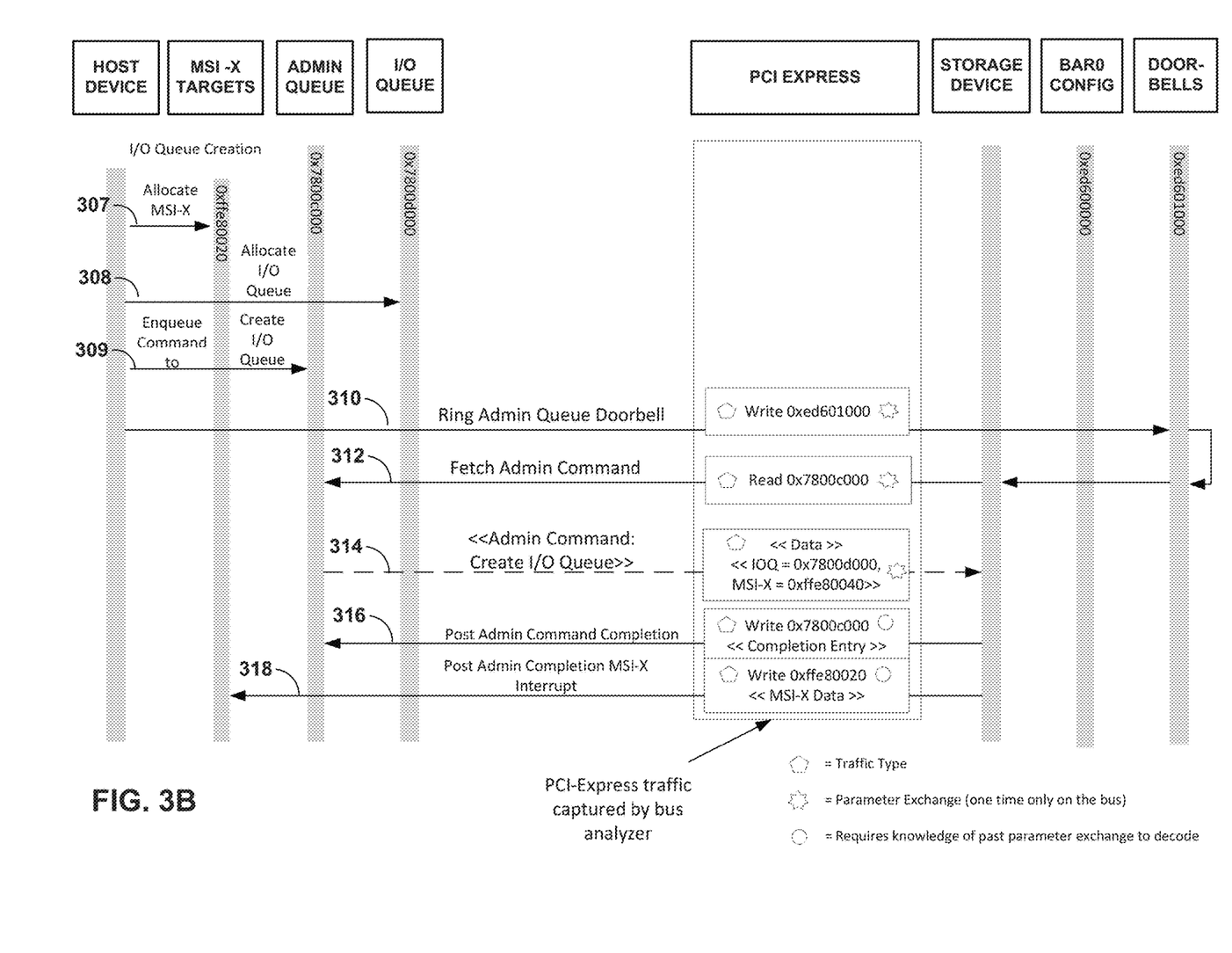

As shown in FIG. 313, in response to creating an admin queue, host device 4 may initialize a third set of protocol parameters by allocating a second MSI-X interrupt vector (307) and allocating an I/O queue (308). In some instances, allocating a second MSI-X interrupt vector may include assigning a register address to the second interrupt vector and allocating an I/O queue may include assigning a host memory address (e.g., a base address), and size to the I/O queue. In some instances, the second MSI-X vector may be associated with the I/O queue. In response to allocating the I/O queue, host device 4 may send a command to the admin queue to create the I/O queue (309).

In some examples, host device 4 may send a notification to storage device 6 indicating that a command is in the admin queue. For example, host device 4 may send the notification by "ringing" the admin queue "doorbell register" (also referred to simply as a "doorbell"). A doorbell may refer to a hardware register of storage device used to store a pointer to a command queue. Host device 4 may ring the doorbell of storage device 6 by sending a write command to storage device 6 to write a pointer associated with the admin queue to the doorbell register of storage device 6 (310). In response to host device 4 ringing the doorbell, storage device 6 may retrieve an admin command from the admin queue (312). For instance, storage device 6 may retrieve an admin command by sending a read command to host device 4. The read command may specify a read address associated with the admin queue, where the address associated with the admin queue was received by storage device 6 as part of the second set of protocol parameters.

In response to storage device 6 sending the read command to retrieve an admin command, host device 4 may send the third set of protocol parameters to storage device 6 (314). For example, host device 4 may send a command to create an queue, where command to create the I/O queue includes the third set of protocol parameters (e.g., the address data associated with the I/O queue and the address data associated with the MSI-X interrupt vector). After the I/O queue has been created, storage device 6 may send a write command to the admin queue (e.g., the admin completion queue) indicating that create I/O queue command is complete (316) and may send an interrupt to the interrupt register address (318).

Figure 3C:
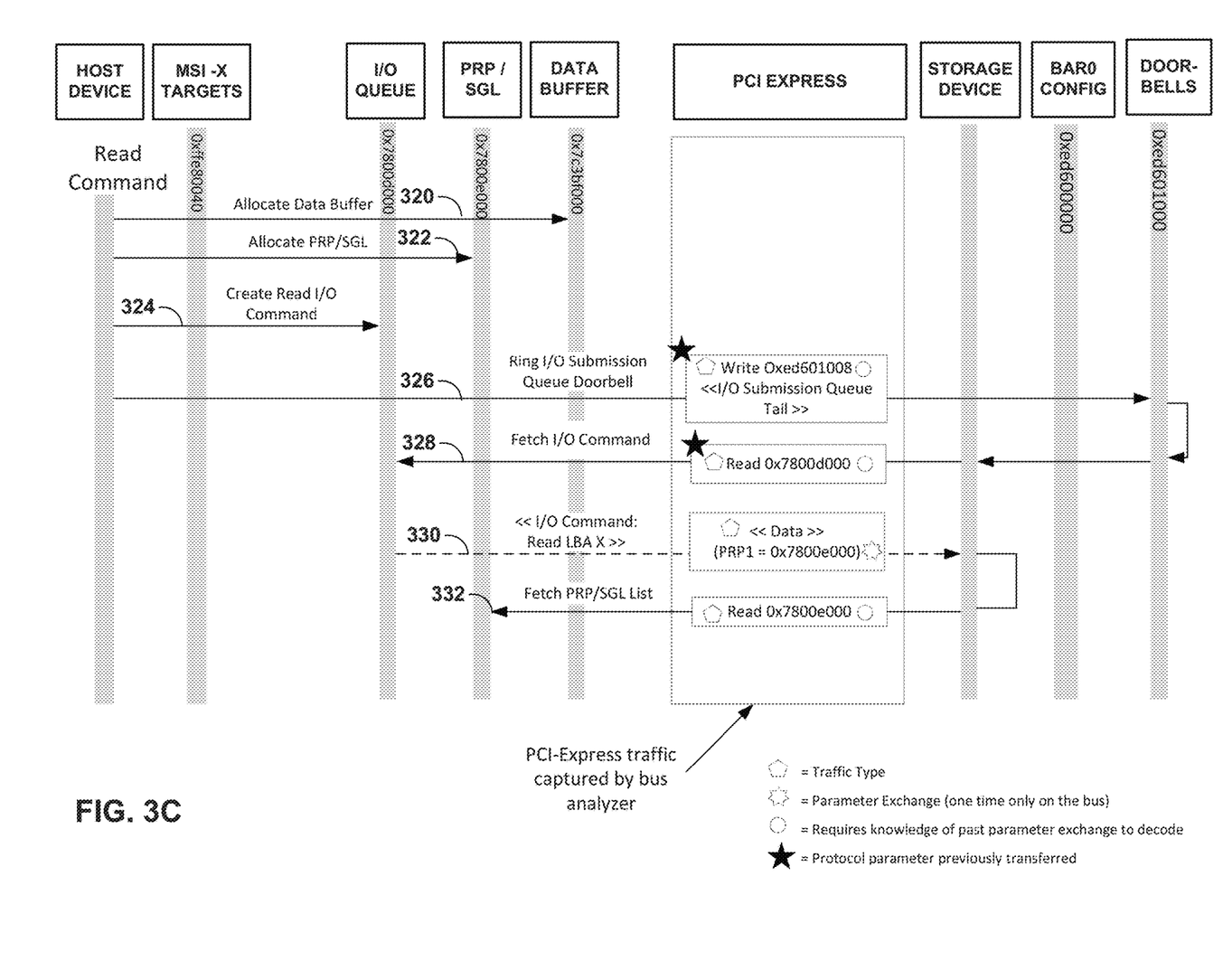

As illustrated in FIG. 3C, in some examples, host device 4 may allocate a portion of host memory 46 to be a data buffer and may initialize a set of protocol parameters by assigning a memory address of host memory 36 to act as the data buffer (320). The data buffer may be used to store data received from NVM 10 of storage device 6. Host device 4 may allocate a portion of host memory 46 for use as a physical region page (PRP) or scatter gather list (SGL) and may initialize a set of protocol parameters by assigning a memory address of host memory 46 to use as a PRP or SGL (322). A PRP or SGL may identify a set of memory addresses within the data buffer where data retrieved from NVM 10 is to be stored.

Host device 4 may create a read command to read data from NVM 10 of storage device 6 and may copy the read command to I/O queue memory space (324). After sending the read command to the 110 queue, host device 4 may send a notification to the doorbell register of storage device 6 (e.g., "ring the doorbell" of storage device 6) indicating that a new command is in the I/O queue (326). For example, the notification may include a write command, which may cause host device 4 to send an address associated with the I/O queue tail to the doorbell register of storage device 6. In response to host device 4 writing to the doorbell register, storage device 6 may send a read command to the I/O queue to retrieve a command from the I/O queue (328). In some examples, analyzer 30 may not have received the first set of protocol parameters, which may prevent analyzer 30 from decoding the doorbell notification. Similarly, in some examples, analyzer 30 may not have received the third set of protocol parameters, which may prevent analyzer 30 from decoding the command to retrieve data from the I/O queue.

The I/O queue of host device 4 may send a read command to storage device in order to read data from a particular LBA. (330). In some examples, the read command may include an LBA associated with NVM 10 from which to read data and a fourth set of protocol parameters. The fourth set of protocol parameters may include a host memory address at which a PRP or SGL is located, where the PRP or SGL identifies a set of memory addresses at which the data read from NVM 10 should be stored. Storage device 6 may receive, from the 110 queue, the read command and the memory address associated with the PRP/SGL, and may send a read command to host device 4 to retrieve a list of memory addresses (e.g., corresponding to a list of pages) specified by the PRP/SGL (332).

Figure 3D:
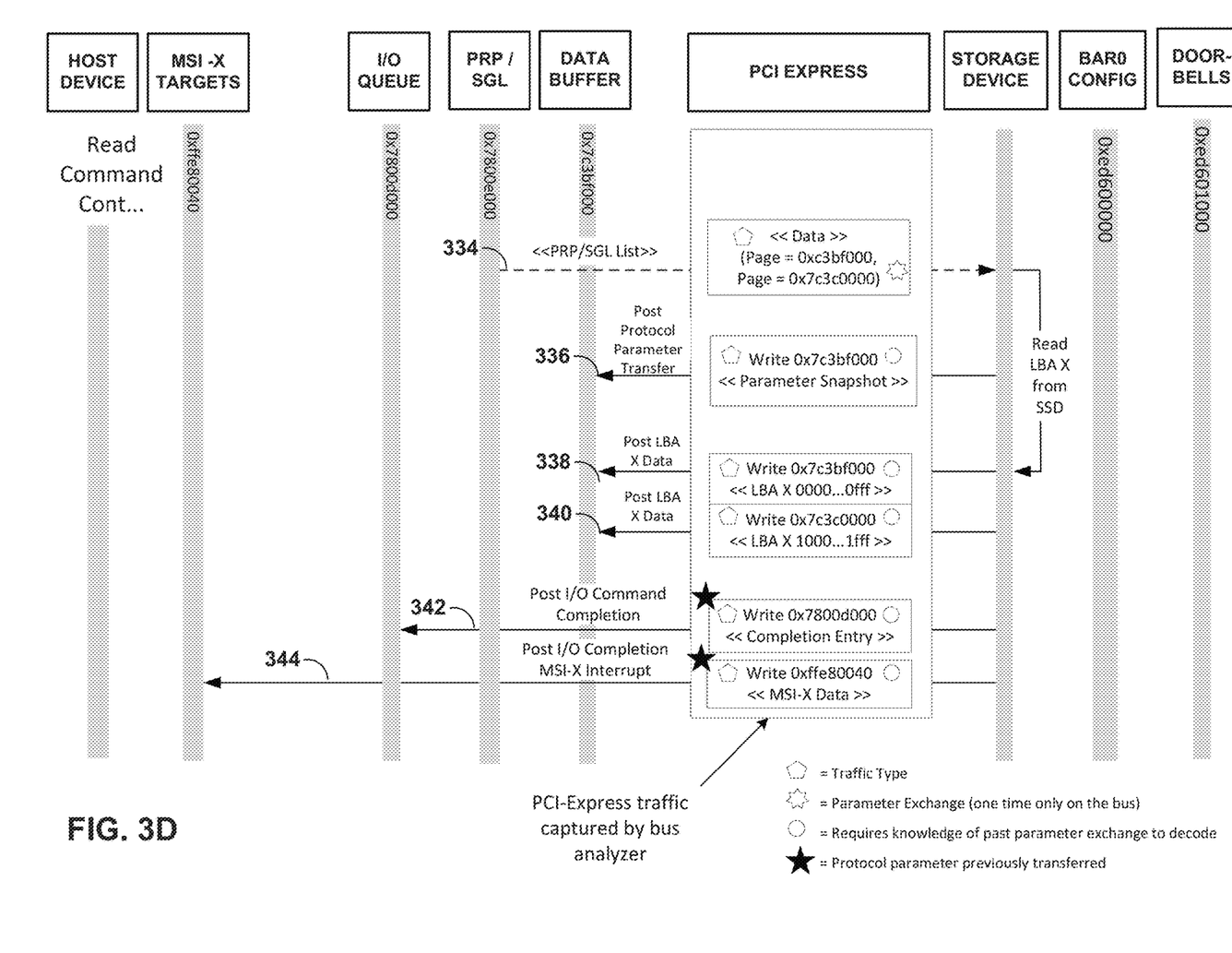

As illustrated in FIG. 3D, in response to receiving the command for the list of memory addresses specified by the PRP/SGL, host device 4 may send a fifth set of protocol parameters to storage device 6 (334). The fifth set of protocol parameters may include a list of memory addresses (e.g., a set of one or more pages) identified by the PRP/SGL, where the list of memory addresses specify a location of the data buffer at which to store data retrieved from NVM 10 of storage device 6.

Storage device 6 may resend a set of one or more protocol parameters to host device 4 (336). In some examples, storage device 6 may resend the set of one or more protocol parameters in response to receiving the read command and/or determining that a threshold value has been satisfied (e.g., a threshold amount of data, threshold amount of time, or threshold number of commands). In some examples, storage device 6 may resend the set of protocol parameters by sending a write command to host device 4. The write command may include a data packet that includes the set of protocol parameters and specifies an address within host memory 46 at which host device 4 should write the set of protocol parameters. The data packet may include the first set of protocol parameters, the second set of protocol parameters, the third set of protocol parameters, the fourth set of protocol parameters, the fifth set of protocol parameters, or any combination of previously sent protocol parameters. In some instances, the address specified by the write command may include the addresses specified by the PRP/SGL, which was previously received from host device 4. By sending the write command, which includes the set of protocol parameters, to host device 4, storage device 6 may inject the set of protocol parameters into a data stream. In some instances, the data packet may be defined by one or more features, such as a format of the header of the data packet. In other words, the analyzer may intercept the data packet and determine the data packet includes the set of protocol parameters based on the defining one or more features of the data packet. Analyzer 30 may intercept the set of protocol parameters and may use the set of protocol parameters to decode subsequent data transfers between host device 4 and storage device 6.

In some examples, in response to writing the set of protocol parameters to at least one of the memory addresses specified by the PRP/SGL, storage device 6 may send a write command to host device 4 in order to cause host device 4 to store the data retrieved from NVM 10 to a data buffer within host device 4. For instance, storage device 6 may store a first portion of the data retrieved from NVM 10 to a first page of the data buffer (338) and may store a second portion of the data retrieved from NVM 10 to a second page of the data buffer (340). By sending a second write command that includes the data requested by host device 4, storage device 6 may enable host device 4 to receive the data requested by the read command. In response to writing the data to the memory addresses specified by the PRP/SGL, storage device 6 may send a write command to the I/O queue (e.g., I/O completion queue) of host device 4 indicating that the command to read data from NVM 10 is complete (342). In some instances, having intercepted the set of protocol parameters resent by storage device 6, analyzer 30 may decode the write command. Storage device 6 may send a write command to an MSI-X target to interrupt the processor (344), which may be intercepted and decoded by analyzer 30.

Figure 4:
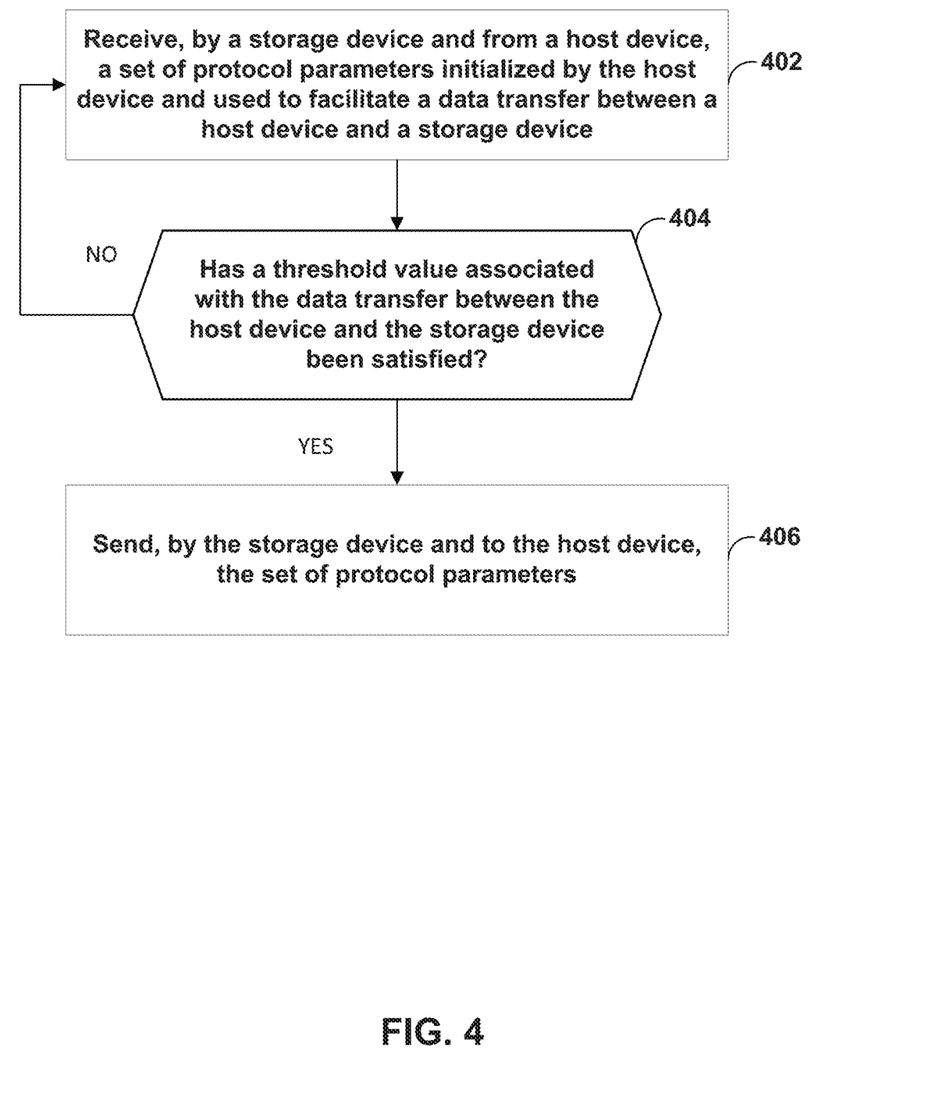
FIG. 4 is a flow diagram illustrating an example technique for exchanging protocol parameters in accordance with one or more techniques of this disclosure, to facilitate analyzer operation.

FIG. 4 is a flow diagram illustrating an example technique for exchanging protocol parameters in accordance with one or more techniques of this disclosure, to facilitate analyzer operation. For ease of illustration, the technique of FIG. 4 will be described with concurrent reference to storage environment 2 of FIGS. 1-2. However, the techniques may be used with any combination of hardware or software.

In some examples, host device 4 may initialize a set of one or more protocol parameters used to facilitate data transfer between host device 4 and storage device 6. Host device 4 may initialize the set of protocol parameters by assigning a memory address to a functionality of host device 4 or storage device 6. For example, host device 4 may initialize the set of protocol parameters by assigning a BAR0 address to a PCI function of storage device 6, assigning a memory address, and size to a command queue, or assigning a register address to an interrupt vector.

Storage device 6 may receive the set of protocol parameters from host device 4 (402). In some examples, storage device 6 may receive the set of protocol parameters as part of a write command. For example, storage device 6 may receive a write command that causes storage device 6 to store the set of protocol parameters (e.g., a BAR address associated with a PCI function) to a configuration space of storage device 6. As another example, storage device 6 may receive a write command that causes storage device 6 to store address information associated with an admin queue (e.g., a host memory address and size) and address information associated with an interrupt vector (e.g., a register address) to the configuration space of storage device 6. In some examples, the set of protocol parameters received by storage device 6 may include address information associated with an I/O queue (e.g., a host memory address and size) and address information associated with an interrupt vector. In some examples, the set of protocol parameters received by storage device 6 may include a PRP list or a set of pages associated with a read command to storage device 6.

Storage device 6 may determine whether a threshold value associated with the data transfer between the host device and the storage device has been satisfied (404). In some instances, a threshold value may refer to a threshold amount of data, a threshold amount of time, or a threshold number of commands. For instance, storage device 6 may determine that the threshold value is satisfied if the amount of data transferred since the protocol parameters were most recently transferred is greater than or equal to the threshold amount of data. In some examples, the threshold amount of data may be based on the size of analyzer memory 36. In some instances, storage device 6 may determine that the threshold value is satisfied if the number of commands transferred between host device 4 and storage device 6 since either host device 4 or storage device 6 most recently transferred the set of protocol parameters is greater than or equal to the threshold number of commands. In some instances, storage device 6 may determine that the threshold amount of time is satisfied if the amount of time since the protocol parameters were last transferred is greater than or equal to a threshold amount of time. In response to determining that the threshold value has not been met (404, NO path), storage device may repeat operation 402 to receive additional protocol parameters from host device 4.

In some examples, in response to determining that the threshold value has been met (404, YES path), storage device 6 may resend the set of protocol parameters to host device 4 (406). In some examples, storage device 6 may send the set of protocol parameters as part of a data packet. The data packet may be defined by one or more features, such as a size of the data packet, a memory address specified by the data packet, a format of the header of the data packet (e.g., a predefined header format), or a function indicated by the data packet. In other words, analyzer 30 may intercept the data packet as the packet is transferred between host device 4 and storage device 6 and may determine the data packet includes the set of protocol parameters based on the one or more features that define the data packet.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
receiving, by a storage device from a host device, a set of protocol parameters initialized by the host device and used to facilitate data transfer between the host device and the storage device;
determining, by the storage device, that a threshold value of a criterion associated with the data transfer between the host device and the storage device has been satisfied, comprising:
identifying a present value of the criterion; and
comparing the present value with the threshold value to determine whether the present value meets or exceeds the threshold value; and
in response to determining that the threshold value has been satisfied, sending, by the storage device to the host device using one or more data packets, the set of protocol parameters that were received from the host device,
wherein:
the one or more data packets include identifying features for enabling an analyzer device coupled between the host and storage devices to intercept the set of protocol parameters for decoding, at the analyzer device, data in the data transfer, identifying an error in the data transfer, and assisting a user with debugging the data transfer to correct the error, and
the criterion comprises at least one of (i) a number of commands transferred between the host device and the storage device since the set of protocol parameters were transferred, or (ii) an amount of data transferred between the host device and the storage device since the set of protocol parameters were transferred.

2. The method of claim 1, wherein the set of protocol parameters comprise at least one of:
a base address associated with a Peripheral Component Interconnect (PCI) function;
a memory address associated with a command queue; or
a register address associated with a message signal interrupt.

3. The method of claim 1, wherein sending the set of protocol parameters includes sending, by the storage device to the host device, the set of protocol parameters via a high level interface protocol operating on top of a low level interface protocol.

4. The method of claim 3, wherein:
the low level interface protocol comprises Peripheral Component Interconnect express (PCIe); and
the high level interface protocol comprises Non-Volatile Memory express (NVMe).

5. The method of claim 1, wherein determining that the threshold value has been satisfied comprises at least one of:
determining, by the storage device, that an amount of time since the set of protocol parameters were transferred is greater than or equal to a threshold amount of time, wherein the criterion comprises the amount of time since the set of protocols were transferred;
determining, by the storage device, that the number of commands transferred between the host device and the storage device since the set of protocol parameters were transferred is greater than or equal to a threshold number of commands, wherein the criterion comprises the number of commands transferred between the host device and the storage device since the set of protocol parameters were transferred; or
determining, by the storage device, that the amount of data transferred between the host device and the storage device since the set of protocol parameters were transferred is greater than or equal to a threshold amount of data, wherein the criterion comprises the amount of data transferred between the host device and the storage device since the set of protocol parameters were transferred.

6. The method of claim 1, wherein sending the set of protocol parameters to the host device is further in response to receiving an indication of a change in a status of a command queue or an interrupt configuration.

7. The method of claim 1, wherein sending the set of protocol parameters comprises sending, by the storage device and to a predefined memory address associated with host device, the set of protocol parameters.

8. The method of claim 7, wherein:
sending the set of protocol parameters further comprises sending a data packet comprising:
a header; and
the set of protocol parameters,
the header of the data packet specifies that a destination of the data packet is the predefined memory address, and
the predefined memory address indicates that the data packet comprises the set of protocol parameters.

9. A data storage device comprising:
a controller configured to:
receive, from a host device, a set of protocol parameters initialized by the host device and used to facilitate data transfer between the host device and the data storage device;
determine by the controller, that a threshold value of a criterion associated with the data transfer between the host device and the storage device has been satisfied, comprising identifying a present value of the criterion, and comparing the present value with the threshold value to determine whether the present value has reached the threshold value; and in response to determining that the threshold value has been satisfied, send, to the host device using one or more data packets, the set of protocol parameters that were received from the host device, wherein:

the one or more data packets include identifying features for enabling an analyzer device coupled between the storage and host devices to intercept the set of protocol parameters for decoding, at the analyzer device, data in the data transfer, for identifying an error in the data transfer, and for assisting with a user debugging the data transfer to correct the error, and the criterion comprises at least one of (i) a number of commands transferred between the host device and the storage device since the set of protocol parameters were transferred, or (ii) an amount of data transferred between the host device and the storage device since the set of protocol parameters were transferred.

10. The data storage device of claim 9, wherein the set of protocol parameters comprise at least one of:

a base address associated with a Peripheral Component Interconnect (PCI) function;

a memory address associated with a command queue; or a register address associated with a message signal interrupt.

11. The data storage device of claim 9, wherein the controller is configured to send the set of protocol parameters by at least sending, to the host device, the set of protocol parameters via a high level interface protocol operating on top of a low level interface protocol.

12. The data storage device of claim 11, wherein:

the low level interface protocol comprises Peripheral Component Interconnect express (PCIe); and the high level interface protocol comprises Non-Volatile Memory express (NVMe).

13. The data storage device of claim 9, wherein the controller is configured to determine a threshold value has been satisfied by at least:

determining that an amount of time since the set of protocol parameters were transferred is greater than or equal to a threshold amount of time, wherein the criterion comprises the amount of time since the set of protocol parameters were transferred;

determining that the number of commands transferred between the host device and the storage device since the set of protocol parameters were transferred is greater than or equal to a threshold number of commands, wherein the criterion comprises the number of commands transferred between the host and storage devices since the set of protocol parameters were transferred; or determining that the amount of data transferred between the host device and the storage device since the set of protocol parameters were transferred is greater than or equal to a threshold amount of data, wherein the criterion comprises the amount of data transferred between the host and storage devices since the set of protocol parameters were transferred.

14. The data storage device of claim 9, wherein the controller is further configured to send the set of protocol parameters to the host device in response to receiving an indication of a change in a status of a command queue or an interrupt configuration.

15. The data storage device of claim 9, wherein the controller is further configured to send the set of protocol parameters by sending the set of protocol parameters to a predefined memory address associated with host device.

16. The data storage device of claim 15, wherein:

the controller is further configured to send the set of protocol parameters by sending, to the host device, a data packet comprising:

a header; and the set of protocol parameters;

the header of the data packet specifies that a destination of the data packet is the predetermined memory address; and the predefined memory address indicates that the data packet comprises the set of protocol parameters.

17. A system comprising:

a host device;

a storage device; and means for analyzing coupled between the host device and the storage device, wherein the host device is configured to:

initialize a set of protocol parameters used to facilitate data transfer between the storage device and the host device; and send, to the storage device, the set of protocol parameters initialized by the host device; and wherein the storage device is configured to:

determine that a threshold value of a criterion associated with the data transfer between the host device and the storage device has been satisfied, comprising identifying a present value of the criterion, and comparing the present value with the threshold value to determine whether the present value has reached the threshold value; and in response to determining that the threshold value has been satisfied, send, to the host device using one or more data packets, the set of protocol parameters received from the host device, wherein:

the one or more data packets include identifying features for enabling the means for analyzing to intercept the set of protocol parameters for decoding, at the means for analyzing, data in the data transfer, identifying an error in the data transfer, and assisting a user with debugging the data transfer to correct the error, and the criterion comprises at least one of (i) a number of commands transferred between the host device and the storage device since the set of protocol parameters were transferred, or (ii) an amount of data transferred between the host device and the storage device since the set of protocol parameters were transferred.

18. The system of claim 17, wherein the set of protocol parameters comprise at least one of:

a base address associated with a Peripheral Component Interconnect (PCI) function;

a memory address associated with a command queue; or a register address associated with a message signal interrupt.

19. The system of claim 17, wherein resending the set of protocol parameters includes resending, by the storage device and to the host device, the set of protocol parameters via a high level interface protocol operating on top of a low level interface protocol.

20. The system of claim 17, wherein:

the storage device is configured to resend the set of protocol parameters in further response to receiving, by the storage device and from the host device, a command to read data and an indication of a memory address associated with the host device to which to send the data;

resending the set of protocol parameters comprises sending, by the storage device to the memory address associated with host device, the set of protocol parameters; and the storage device is further configured to send, in response to resending the set of protocol parameters, to the memory address associated with the host device, the data.

* * * * *